June 24, 1969 W. R. CAREY 3,451,693
VEHICLE SAFETY METHOD AND APPARATUS
Filed Sept. 1, 1967

INVENTOR.
WILLIAM R. CAREY
BY
ATTORNEYS

June 24, 1969 W. R. CAREY 3,451,693
VEHICLE SAFETY METHOD AND APPARATUS
Filed Sept. 1, 1967 Sheet 2 of 2

INVENTOR.
WILLIAM R. CAREY
BY
Yount, Raney, Flynn and Tarolli
ATTORNEYS

United States Patent Office 3,451,693
Patented June 24, 1969

3,451,693
VEHICLE SAFETY METHOD AND APPARATUS
William R. Carey, Farmington, Mich., assignor to Eaton Yale & Towne Inc., Cleveland, Ohio, a corporation of Ohio
Filed Sept. 1, 1967, Ser. No. 665,070
Int. Cl. B60r 21/06
U.S. Cl. 280—150                    14 Claims

ABSTRACT OF THE DISCLOSURE

A vehicle safety method and apparatus protects an occupant of a vehicle during a collision. The safety apparatus includes an inflatable confinement which is normally disposed in a substantially collapsed condition and which is adapted to be inflated in response to a collision condition to provide a restraint for the occupant. The confinement is inflated by releasing fluid from a container having a supply of pressurized fluid. The inflatable confinement has means through which the pressurized fluid may escape. The flow of fluid is such that a substantially constant pressure is maintained in the confinement as the occupant and confinement engage and move relatively during a collision so that the acceleration of the occupant is maintained substantially constant.

---

The present invention relates to a vehicle safety method and apparatus, and more particularly to vehicle safety method and apparatus for protecting an occupant or occupants of a vehicle during a collision.

It is now well established that serious injury or death may occur due to relative movement of different parts of the human body when the latter is subjected to an acceleration or deceleration above a critical value. Such conditions may occur in a high speed automobile collision wherein the automobile is suddenly decelerated to zero or substantially zero speed. If at least the upper part of the occupant were free to move, his forward acceleration could be above the critical value. Likewise, if the occupant was bodily restrained against movement upon a high speed collision occurring certain parts of his body would, due to the sudden deceleration, move relative to other parts which are restained with the result that serious or fatal injury could occur.

In order to prevent this type of injury during a high speed collision, it is necessary to permit relative movement between the occupant and the vehicle and to keep the occupant's acceleration relative to the vehicle below the critical value. While various known safety apparatuses have heretofore been employed for preventing injury during a collision, they have not been very effective during high speed collisions because the restraints provided were usually either insufficient to prevent acceleration above the critical value or they did not allow for sufficient relative movement between the occupant and the vehicle.

Accordingly, it an important object of the present invention to provide a new and improved vehicle safety method and apparatus which is of a relatively simple and economical construction and yet highly effective to prevent serious injuries to the occupant during a high speed collision.

Another object of the present invention is to provide a new and improved vehicle safety apparatus which includes an inflatable confinement for restraining the occupant during a collision and which is so constructed and arranged that the acceleration of the occupant upon engaging and moving relative to the confinement is maintained substantially constant and below the critical value for causing serious injury for a predetermined time interval and then decreased.

Yet another object of the present invention is to provide a new and improved vehicle safety apparatus, as defined in the next preceding object, and in which the acceleration of the occupant is maintained substantially constant by maintaining a substantially constant pressure in the confinement upon the occupant engaging and moving relative thereto.

A further object of the present invention is to provide a new and improved vehicle safety apparatus, as defined in the next preceding object, and in which the substantially constant pressure within the confinement is maintained by providing variable orifice means on the confinement whose size increases as the occupant and the confinement become engaged to enable more and more fluid to be exhausted therefrom.

A still further object of the present invention is to provide a new and improved vehicle safety apparatus, as defined in the preceding objects, and which includes a reservoir of pressurized fluid for inflating the confinement whose volume is substantially in excess of the volume of the confinement when inflated.

Another object of the present invention is to provide a new and improved vehicle safety apparatus, as defined in the preceding objects, and wherein the inflatable confinement is made from a stretchable material and the orifice means is an opening in the material, the opening enlarging due to stretching of the material around the opening upon the occupant moving relative to the confinement to enable a greater amount of fluid to be exhausted therefrom.

The present invention also resides in certain novel constructions and arrangement of parts, and other objects, novel characteristics and advantages of the present invention will be apparent from the following detailed description and in the accompanying drawing forming a part of this specification, and in which similar reference numerals designate corresponding parts throughout the several views of the drawing and in which.

The novel safety method and apparatus of the present invention may be employed in various kinds or types of vehicles, but is particularly susceptible for use in automotive vehicles and airplanes, and for the purposes of illustration is herein shown and described as being used in an automobile 10.

Figure 1:
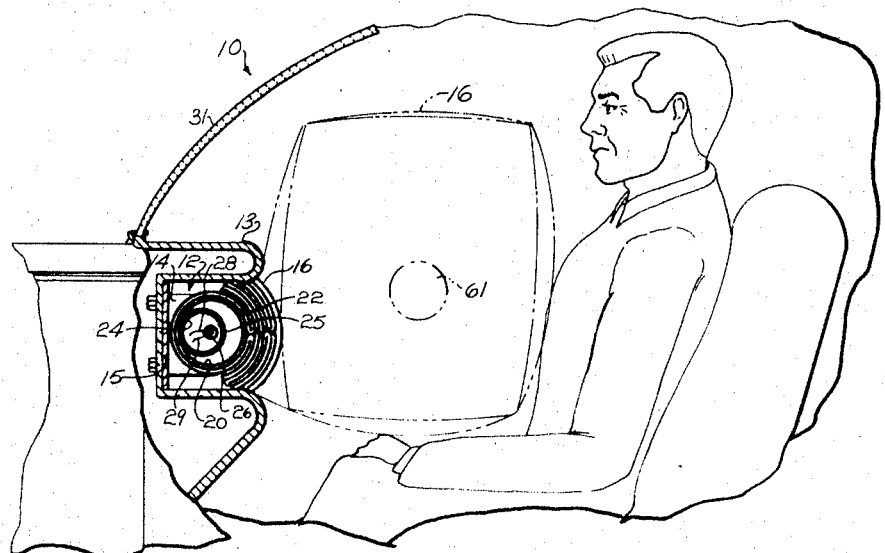
FIG. 1 is a fragmentary side elevational view of a vehicle embodying the novel safety apparatus of the present invention.

As representing one embodiment of the present invention, FIG. 1 of the drawing shows a safety apparatus comprising a safety device 12 mounted within the dashboard 13 of the automobile 10. The safety device 12 includes bracket means 14 which is suitably secured to a dash support structure 15 and an inflatable crash restraint confinement or bag 16. The inflatable confinement 16 is normally in a substantially collapsed or folded condition, as shown by the solid lines in FIG. 1, in which it gives the appearance of being a continuation of the dashboard 13 and the confinement 16 surrounds a cylindrical diffuser tube 20 carried by the bracket means 14. The diffuser tube 20 has a plurality of substantially longitudinally spaced, generally circumferentially extending slots 22 which communicate the interior of the diffuser tube 20 with the interior of the confinement 16.

Disposed within the diffuser tube 20 is a generally cylindrically shaped container or reservoir 24 containing a supply of high pressure fluid, such as carbon dioxide. The container 24 is adapted to be opended to permit release of the high pressure fluid in response to actuation of an explosive charge 26. The explosive charge 26 may be suitably associated with the reservoir 24. The charge 26 is exploded by passing an electric current through a pair of lead wires 28 and 29 electrically connected with the charge 26.

From the foregoing, it can be seen that when the charge 26 is exploded, the explosive force results in opening of the container 24 to permit release of the high pressure fluid contained therein. The released fluid flows into the diffuser tube 20 and then through the openings 22 into the confinement 16 to inflate the latter. The confinement 16 upon being inflated moves relative to the front seat of the automobile 10. The confinement 16 when inflated will assume the position shown by the dotted lines in FIG. 1. The confinemet 16 when inflated provides a restraint which prevents the occupant or occupants in the front seat from being thrown forward against the dashboard 13 and/or windshield 31 of the automobile 10.

The explosive charge 26 is adapted to be exploded only during a collision. To this end, a suitable collision sensing device is provided so as to effect a flow of current through leads 28 and 29 so that charge 26 will only be exploded in response to a collision occurring.

In accordance with the provision of the present invention, the pressure of the pressurized fluid within the confinement 16 is maintained at a substantially constant value so that the restraining force exerted against the occupant as the latter engages and moves into the inflatable confinement 16 will be substantially constant for a predetermined time interval. By providing or maintaining a substantially constant pressure within the confinement 16, the acceleration of the occupant during the collision, upon the occupant engaging and moving into the confinement, will be substantially constant and below the critical value which would result in serious injury to the occupant. As previously noted, this is especially important during high speed collisions due to the fact that serious injury and/or death can take place due to relative movement of different parts of the human body when the acceleration of the occupant exceeds a critical value.

A substantially constant pressure within the confinement 16 is provided by utilizing a supply of pressurized fluid having a volume, when released, which is substantially greater, preferably approximately two to two and one-half times greater, than the volume of the inflatable confinement 16, when inflated, and providing variable orifice means on the inflatable confinement 16. The variable orifice means, in the preferred embodiment, is provided by an opening 60 on the side of the confinement 16, by making the confinement 16 from a stretchable material, such as a plastic, like polyethylene. The opening 60 is preferably provided by a blowout or rupturable patch 61 on the side of the confinement 16. The patch 61 is adapted to rupture or blow out upon the occupant engaging the confinement 16 after the latter is inflated. Since the confinement 16 is made from a stretchable material, the opening 60 stretches or enlarges upon the occupant engaging and moving into the confinement 16 so that a larger volume of fluid will be expelled and a substantially constant pressure maintained. It should be apparent that the maintenance of a substantially constant pressure within the confinemet 16 may be effected even though the confinement is not made of a stretchable material as long as at least the area of the confinement in which the opening 60 is formed is made of a stretchable material, as described above.

Figure 2:
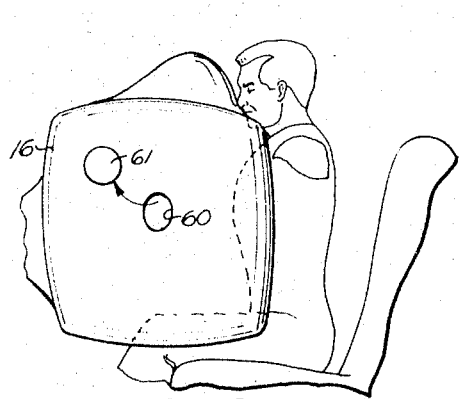
FIGS. 2 and 3 are fragmentary schematic views showing certain parts of the safety apparatus in different positions.
Figure 3:
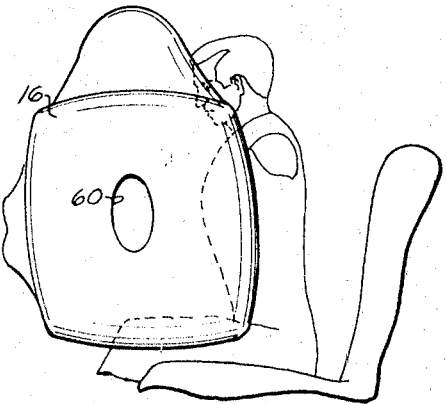
Figure 4:
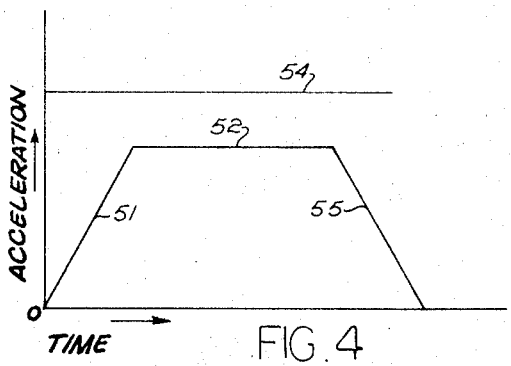
FIG. 4 is a graph showing acceleration versus time.

The operation of the safety device 12 will best be understood with reference to the schematic views shown in FIGS. 2 and 3 and by the graph shown in FIG. 4 which shows acceleration plotted against time. When a collision occurs the explosive charge 26 is detonated and causes the container 24 to be opened. When the container 24 is opened, the pressurized fluid therein is released and flows into the diffuser tube 20 and then through the opening 22 in the diffuser tube 20 into the interior of the inflatable confinement 16 to cause the latter to be inflated to the position shown by the dotted line in FIG. 1. Meanwhile, the occupant upon the collision occurring will be hurled forwardly with the occupant's movement relative to the vehicle being at an accelerated rate of speed. The acceleration of the occupant from the time of the collision to the time the occupant engages the confinement 16 is indicated by line 51 in the graph shown in FIG. 4.

As the occupant and confinement engage and move relatively, as shown schematically in FIG. 2, the blowout patch 61 will rupture to provide the opening 60 whereupon fluid will begin to be exhausted from the confinement 16. The volume of fluid exhausted depends upon the rate of flow of fluid into the confinement, the amount of stretching of the confinement that occurs, and the volume of fluid displaced by the occupant moving into the confinement. As the occupant begins to move into the confinement, the pressure of the fluid in the confinement tends to be increased due to the fact that the occupant is tending to collapse the confinement. However, since the confinement 16 is made from a stretchable material, the material around the opening 60 will stretch to enable the opening to enlarge, as shown in FIG. 3, which in turn enables more fluid to be exhausted from the interior of the confinement 16 so that the pressure tends to be reduced whereby the pressure in the confinement 16 is maintained substantially constant as the occupant moves relative to the confinement. By maintaining a constant pressure within the confinement 16, a substantially constant force resisting movement of the occupant is provided whereby the occupant's acceleration during movement relative to the confinement, which is for a predetermined time interval, is maintained substantially constant, as indicated by line 52 in the graph shown in FIG. 4. It should be noted that the above-described structure will limit the forward acceleration of the occupant to a value which is substantially below the critical value for causing serious injury, the critical value being indicated by line 54 in the graph shown in FIG. 4.

After the occupant moves into the confinement 16 a certain distance, the forward movement of the latter will be at a decelerated rate of speed, as indicated by the line 55 in the graph shown in FIG. 4.

From the foregoing, it should be apparent that the novel safety method and apparatus of the present invention will prevent acceleration of the occupant above the critical value, as indicated by the line 54 in the graph in FIG. 4, and will provide for relative movement between the occupant and the automobile 10 for a certain time interval and with the movement of the occupant being at a substantially constant acceleration for that time period. The advantage of the novel safety method and apparatus of the present invention is that it is highly effective during high speed collisions in that it will substantially prevent serious injuries and/or death during this type of collision.

It will, of course, be understood that more than one opening could be provided in the confinement 16 and that other and different variable orifice means could be provided in place of a rupturable blowout patch and that the stretchable confinement 16 could extend across the dashboard so as to prevent injury to all the occupants sitting in the front seat or be located at any other suitable location in the automobile so as to prevent injury to any of the occupants of the automobile 10.

Figure 5:
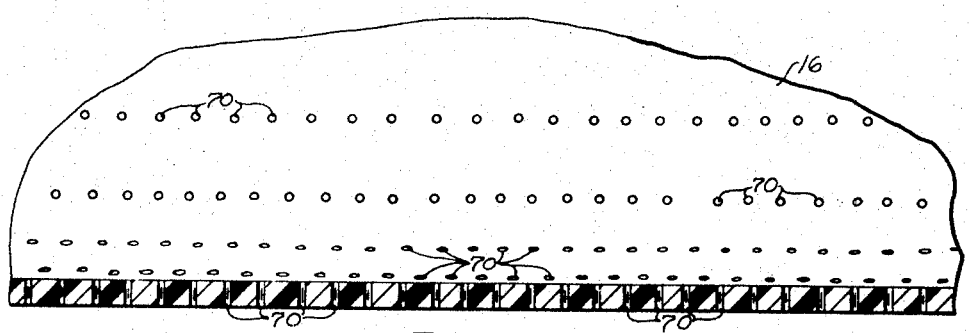
FIG. 5 is a fragmentary sectional view of a modification of the present invention.

The maintenance of a substantially constant pressure in the confinement 16, as described above, may be effected by the construction shown in FIG. 5. In FIG. 5, the confinement 16 is provided with a plurality of openings 70 therein. The confinement is made of a stretchable material or at least that portion of the confinement which contains openings 70 is made of a stretchable material. As a result, as the occupant of the vehicle and the confinement move relatively, the size of the openings 70 will vary in much the same manner as the size of the opening 60 described hereinabove in connection with FIGS. 1–4. In this manner, the openings 70 will function to maintain a substantially constant pressure in the confinement 16.

Figure 6:
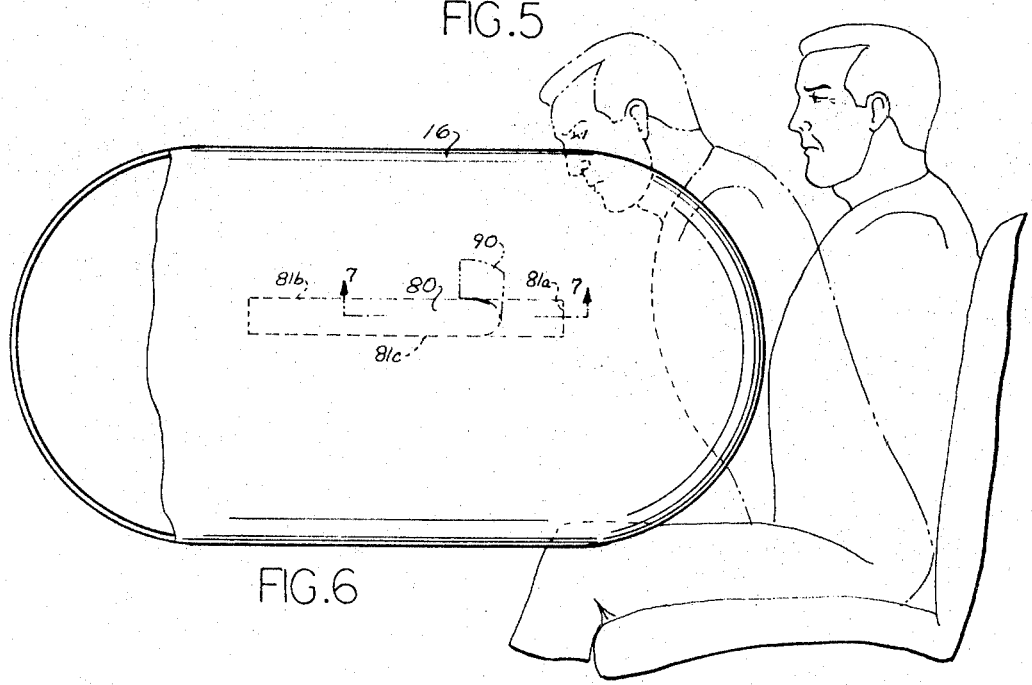
FIG. 6 is a schematic side elevational view of still another modification of the present invention.
Figure 7:
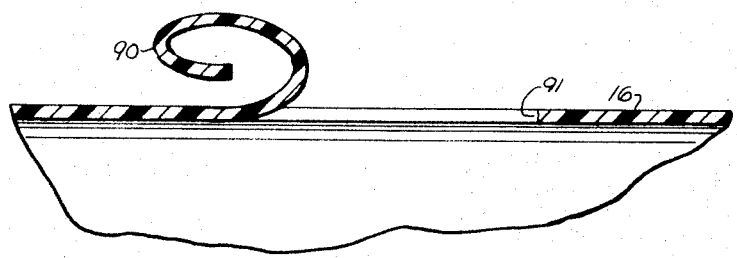
FIG. 7 is a sectional view, taken approximately along the section line 7—7 of FIG. 6.

A still further embodiment of the present invention is illustrated in FIGS. 6 and 7. In the embodiment of FIGS. 6 and 7, the confinement 16 is provided with a means for maintaining a substantially constant pressure in the confinement 16 for a predetermined time interval while the occupant moves relative to the confinement. As a result, the acceleration of the occupant relative to the vehicle is maintained substantially constant for that time interval. The means for maintaining the substantially constant pressure in the confinement 16, as shown in FIG. 6, constitutes a tear strip 80 formed in the wall of the confinement 16.

The tear strip 80 is defined on three sides by perforated lines 81a, 81b, 81c. When the occupant of the vehicle and the confinement 16 move relatively, there is an increase in pressure within the confinement 16. As a result, the perforated lines 81a, 81b, 81c tear and the strip 80 takes a position such as indicated in dotted lines in FIG. 6 and designated 90. The tearing back of the strip provides an opening 91 in the confinement 16, as shown in FIG. 7. As a result, fluid flows outtwardly of the confinement 16 in much the same manner as the fluid flows outwardly in the embodiment of FIG. 4. Moreover, the amount of tearing of the strip 80 and the size of the opening 91 in the confinement 16 may depend upon pressure in the confinement 16 which, in turn, depends upon the amount of relative movement between the confinement and the occupant. Thus, as the pressure in the confinement 16 increases, the amount of tearing of the strip will increase and, therefore, the size of the opening 91 will increase.

In order to facilitate tearing of the strip 80 in the manner illustrated and described hereinabove, the tear line designated 81a may be cut completely through the confinement 16 to provide a slit in the confinement. Thus, as the fluid rushes into the confinement 16 to inflate the confinement, the fluid will flow through the tear line 81a. As the pressure increases in the confinement, the srtip 80 will more assuredly tear from the line 81a thereof along the parallel tear lines shown as 81b and 81c.

It should be apparent, of course, that other modifications may be utilized wherein a plurality of tear strips may be utilized rather than the individual tear strip shown.

From the foregoing, it should be apparent that the hereinbefore enumerated objects and others have been accomplished and that a new and improved vehicle safety method and apparatus for protecting an occupant or occupants against injury during a collision has been provided. Although the illustrated embodiment has been described herein in great detail, it should be apparent that certain modifications, changes, and adaptations may be made in the illustrated embodiment and it is hereby intended to cover all such modifications, changes, and adaptations which come within the scope of the appended claims.

Having described my invention, I claim:

1. A vehicle safety apparatus for protecting an occupant of a vehicle during a collision comprising, an inflatable confinement normally disposed in an inoperative condition, inflating means in communication with said confinemnt for inflating said confinement, said confinement having wall means engageable by the occupant as the occupant moves relative to the vehicle during a collision, and means for maintaining a substantially constant pressure in said confinement for a predetermined time interval while the occupant moves relative thereto maintaining the acceleration of the occupant relative to the vehicle substantially constant for said time interval.

2. A vehicle safety apparatus as defined in claim 1 wherein said inflatable confinement is made from a stretchable material, and wherein said means comprises an opening in said confinement and with the material of the confinement stretching to enlarge said opening to allow more fluid to be exhausted from the confinement as the occupant continues to move further into the confinement.

3. A vehicle safety apparatus for protecting an occupant of a vehicle during a collision comprising, an inflatable confinement normally disposed in a substantially collapsed condition, inflating means in communication with said confinement for inflating said confinement, said cofinement having wall means engagable by the occupant as the occupant moves relative to the vehicle during a collision, and means for maintaining a substantially constant pressure in the confinement while the occupant moves relative thereto, said means including orifice means for continually exhausting fluid from the confinement while the occupant moves into said confinement and a supply of pressurized fluid having a volume which is substantially in excess of the volume of the inflatable confinement when the latter is inflated to maintain fluid flow for a predetermined time interval.

4. A vehicle safety apparatus for protecting an occupant of a vehicle during a collision comprising, an inflatable confinement, a container containing a supply of pressurized fluid in communication with the interior of said confinement, means for releasing said fluid from said container to inflate said confinement, said confinement having wall means engageable by the occupant as the occupant moves relative to the vehicle during a collision, said container having a volume of pressurized fluid which is substantially in excess of the volume of the inflatable confinement when inflated, and means for exhausting fluid from said inflatable confinement, said means being operable to increase the volume of fluid exhausted as the occupant moves into the confinement to maintain a substantially constant pressure in said confinement for a predetermined time interval.

5. A vehicle safety apparatus as defined in claim 4 wherein said inflatable confinement is made from a stretchable material, and wherein said means comprises at least one variable orifice in said confinement and with the material of the confinement stretching to enlarge said orifice to allow more fluid to be exhausted from the confinement as the occupant continues to move further thereinto.

6. A method of protecting an occupant of a vehicle during a collision comprising the steps of inflating an inflatable confinement with a pressurized fluid to restrain movement of the occupant in response to a collision condition occurring, and maintaining a substantially constant pressure in said confinement while the occupant moves into the confinement for a predetermined time interval so that the acceleration of the occupant relative to the vehicle upon engagement with and movement relative to said confinement remains substantially constant for a predetermined time interval.

7. A method as defined in claim 6 wherein the step of maintaining a substantially constant pressure in said confinement is carried out by progressively exhausting a greater volume of fluid as the occupant moves further into the confinement.

8. A method as defined in claim 7 wherein the step of maintaining a substantially constant pressure in the confinement is further carried out by providing a volume of pressurized fluid for inflating the confinement which is substantially in excess of the volume of said confinement.

9. A method as defined in claim 8 wherein the volume of fluid provided for inflating the confinement is at least twice the volume of the inflatable confinement.

10. Vehicle safety apparatus for protecting an occupant of a vehicle during a collision comprising, an inflatable confinement normally disposed in an inoperative condition, inflating means in communication with said confinement for inflating said confinement, said confinement having wall means engageable by the occupant as the occupant moves relative to the vehicle during the collision, and means for exhausting fluid from said confinement and operable to increase the amount of fluid exhausted as the pressure of said occupant against said confinement increases to maintain a substantially constant pressure in said confinement.

11. Vehicle safety apparatus as defined in claim 10 wherein said confinement includes at least a stretchable portion and said last-recited means comprises a plurality of openings located in said stretchable portion of said confinement.

12. Vehicle safety apparatus as defined in claim 10 wherein said inflatable confinement has at least a portion thereof made of a stretchable material and wherein said last-recited means comprises an opening in said confinement with the material of said confinement stretching to enlarge said opening as the pressure in the confinement increases.

13. Vehicle safety apparatus as defined in claim 10 wherein said last-recited means comprises a strip means located on the confinement and which moves relative to the confinement upon pressure increase in the confinement to provide an opening in the confinemet for exhausting of fluid from the confinement.

14. Vehicle safety apparatus as defined in claim 10 wherein said strip means is defined at least in part by perforate lines which provide weakened areas of the confinement which tear in response to pressure increase in the confinement.

References Cited

UNITED STATES PATENTS 2,834,609   5/1958   Bertrand _____ 280—150

FOREIGN PATENTS 953,312   3/1964   Great Britain.

KENNETH H. BETTS, *Primary Examiner.*

J. E. SIEGEL, *Assistant Examiner.*